United States Patent
Tang et al.

(10) Patent No.: US 10,178,563 B2
(45) Date of Patent: Jan. 8, 2019

(54) METHOD AND APPARATUS FOR PROCESSING FAULT IN MULTI-OPERATOR CORE NETWORK

(71) Applicant: HUAWEI TECHNOLOGIES CO., LTD., Shenzhen (CN)

(72) Inventors: Binsong Tang, Shenzhen (CN); Hongzhuo Zhang, Shanghai (CN); Mingzeng Dai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/177,832

(22) Filed: Jun. 9, 2016

(65) Prior Publication Data
US 2016/0295432 A1    Oct. 6, 2016

Related U.S. Application Data
(63) Continuation of application No. PCT/CN2013/088961, filed on Dec. 10, 2013.

(51) Int. Cl.
*H04W 24/00*    (2009.01)
*H04W 24/04*    (2009.01)
(Continued)

(52) U.S. Cl.
CPC ............. *H04W 24/04* (2013.01); *H04L 43/10* (2013.01); *H04W 24/08* (2013.01); *H04W 36/38* (2013.01)

(58) Field of Classification Search
CPC ...... H04W 24/00; H04W 24/08; H04W 16/18
See application file for complete search history.

(56) References Cited

U.S. PATENT DOCUMENTS 6,151,620 A * 11/2000 Madsen ................... G06F 8/65
                                                    709/204
6,466,788 B1 * 10/2002 Carlsson ................ H04W 8/08
                                                    455/435.2
(Continued)

FOREIGN PATENT DOCUMENTS

| CN | 1491519 A   | 4/2004 |
| CN | 101753464 A | 6/2010 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.5.0, 3GPP Organizational Partners, Sep. 2013, Valbonne, France, pp. 1-34.

(Continued)

*Primary Examiner* — Stephen M D Agosta
(74) *Attorney, Agent, or Firm* — Staas & Halsey LLP (57) ABSTRACT

A method and an apparatus for processing a fault in a multi-operator core network are disclosed. The method is applied to a first base station, where multiple operators share a network within coverage of the first base station, and the method includes: acquiring an identifier of a faulty operator, where the faulty operator is an operator whose network is faulty within coverage of the first base station; and notifying UE served by the first base station of the identifier of the faulty operator by using a specified message, so that the UE served by the first base station no longer accesses the network of the faulty operator within coverage of the first base station.

9 Claims, 6 Drawing Sheets

(51) Int. Cl.
*H04L 12/26* (2006.01)
*H04W 24/08* (2009.01)
*H04W 36/38* (2009.01)

(56) References Cited

U.S. PATENT DOCUMENTS

| | | | |
|---|---|---|---|
| 8,565,689 B1 | 10/2013 | Rubin et al. | |
| 8,660,045 B2* | 2/2014 | Lundstrom | H04L 43/10 370/310 |
| 2002/0198968 A1* | 12/2002 | Shirriff | H04L 41/0806 709/220 |
| 2005/0090251 A1* | 4/2005 | Kuchibhotla | H04W 60/04 455/435.1 |
| 2005/0090255 A1 | 4/2005 | Kuchibhotla et al. | |
| 2007/0058528 A1* | 3/2007 | Massa | G06F 11/2005 370/218 |
| 2009/0213834 A1* | 8/2009 | Amirijoo | H04W 60/00 370/352 |
| 2009/0325577 A1* | 12/2009 | Furtenback | H04W 36/0061 455/436 |
| 2011/0211441 A1* | 9/2011 | Matityahu | H04L 43/0811 370/217 |
| 2011/0228672 A1* | 9/2011 | Bianconi | H04W 48/06 370/230 |
| 2011/0237183 A1* | 9/2011 | Sachs | H04W 28/20 455/26.1 |
| 2011/0263252 A1* | 10/2011 | Saini | H04W 48/16 455/434 |
| 2012/0014332 A1* | 1/2012 | Smith | H04W 16/14 370/329 |
| 2012/0026961 A1* | 2/2012 | Pittmann | H04W 28/16 370/329 |
| 2012/0264466 A1* | 10/2012 | Vainola | H04W 48/18 455/500 |
| 2013/0035064 A1* | 2/2013 | Balachandran | H04W 48/02 455/411 |
| 2013/0124752 A1* | 5/2013 | Griffith | G06F 11/3006 709/235 |
| 2013/0183971 A1 | 7/2013 | Tamaki et al. | |
| 2013/0189971 A1* | 7/2013 | Callender | H04W 36/0094 455/423 |
| 2013/0301609 A1 | 11/2013 | Smith et al. | |
| 2013/0337799 A1* | 12/2013 | Ekici | H04W 48/20 455/423 |

FOREIGN PATENT DOCUMENTS

| | | |
|---|---|---|
| CN | 101795232 A | 8/2010 |
| CN | 102625418 A | 8/2012 |
| CN | 103024868 A | 4/2013 |
| CN | 103037471 A | 4/2013 |
| CN | 103200637 A | 7/2013 |
| EP | 1 360 862 B1 | 6/2011 |
| EP | 2 750 451 A1 | 7/2014 |
| WO | 2013/137629 A1 | 9/2013 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.1.0, 3GPP Organizational Partners, Sep. 2013, Valbonne, France, pp. 1-470.

"LTE; Evolved Universal Terrestrial Radio Access (E-UTRA); User Equipment (UE) procedures in idle mode (3GPP TS 36.304 version 11.5.0 Release 11)", ETSI TS 136 304 V11.5.0, ETSI, 3GPP A Global Initiative, Sep. 2013, France, pp. 1-36.

International Search Report and Written Opinion dated Aug. 13, 2014 in corresponding International Patent Application No. PCT/CN2013/088961.

Extended European Search Report dated Sep. 15, 2016 in corresponding European Patent Application No. 13899001.5.

International Search Report dated Aug. 13, 2014, in corresponding International Application No. PCT/CN2013/088961.

Chinese Office Action issued Aug. 31, 2018 in corresponding Chinese Patent Application No. 201380003408.8, 11 pgs.

* cited by examiner

METHOD AND APPARATUS FOR PROCESSING FAULT IN MULTI-OPERATOR CORE NETWORK

CROSS-REFERENCE TO RELATED APPLICATIONS

This application is a continuation of International Application No. PCT/CN2013/088961, filed on Dec. 10, 2013, which is hereby incorporated by reference in its entirety.

TECHNICAL FIELD

The present invention relates to network sharing technologies in network communications, and in particular, to a method and an apparatus for processing a fault in a multi-operator core network.

BACKGROUND

A network sharing (Network sharing) technology can implement that multiple operators (Operator) provide services for respective users by using one shared mobile network, thereby greatly reducing costs of repeated construction of mobile networks. However, despite many advantages, this type of sharing usually causes increased network complexity. Particularly when the network is faulty, processing becomes more difficult.

Figure 1:
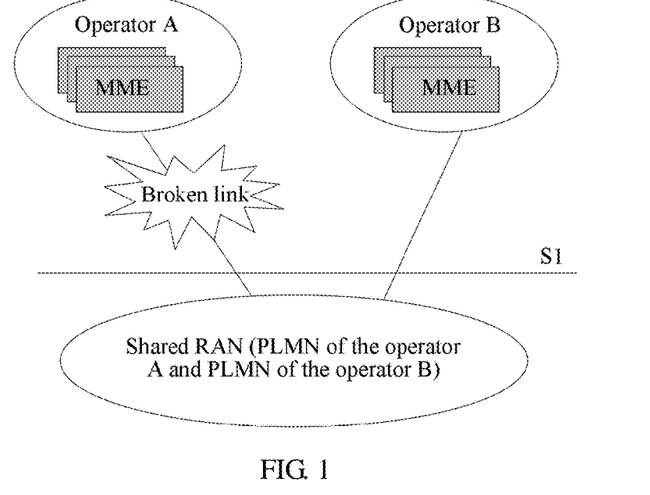
FIG. 1 is a schematic diagram showing that a link is broken in a multi-operator core network.

A typical scenario is that services provided by multiple operators exist in a cell (Cell) within coverage of one base station. Networks of the operators in the cell may be referred to as PLMNs (Public Land Mobile Network, public land mobile network) of the operators. The PLMNs of the operators share a RAN (Radio Access Network, radio access network) of the cell. A fault occurs in a network of an operator at a moment because of some reasons. For example, an S1 link from the RAN to an MME (Mobility Management Entity, mobility management entity) is broken, as shown in FIG. 1. Because there is no corresponding processing method currently, an abnormal phenomenon may occur, such as a phenomenon that UE (user equipment, User Equipment) still attempts to access the faulty network of the operator, causing a negative impact.

SUMMARY

In view of this, an objective of embodiments of the present invention is to provide a method and an apparatus for processing a fault in a multi-operator core network, to prevent UE in a multi-operator core network from accessing an operator whose network is faulty within coverage of a base station.

To resolve the foregoing technical problem, the embodiments of the present invention disclose the following technical solutions:

According to a first aspect, an apparatus for processing a fault in a multi-operator core network is provided, applied to a first base station, where multiple operators share a network within coverage of the first base station, and the apparatus includes:

a faulty-operator identifier acquiring unit, configured to acquire an identifier of a faulty operator, where the faulty operator is an operator whose network is faulty within coverage of the first base station; and a UE notification unit, configured to notify UE served by the first base station of the identifier of the faulty operator by sending a specified message, so that the UE served by the first base station no longer accesses the network of the faulty operator within coverage of the first base station, where the specified message includes the identifier of the faulty operator.

With reference to the first aspect, in a first possible implementation manner, the specified message is a system information block SIB message, a cell barred cellBarred field of the SIB message includes a faulty-operator list, and the faulty-operator list includes the identifier of the faulty operator.

With reference to the first aspect, in a second possible implementation manner, the apparatus further includes:

an adjacent-base station notification unit, configured to notify a second base station adjacent to the first base station of the identifier of the faulty operator, so that the second base station forbids UE served by the second base station to be handed over to the network of the faulty operator within coverage of the first base station.

With reference to the first aspect, in a third possible implementation manner, the apparatus further includes:

a UE access stopping unit, configured to: when receiving a UE handover request sent by a second base station adjacent to the first base station, reject the UE handover request, where the UE handover request is a request, of UE served by the second base station, for being handed over to the network of the faulty operator within coverage of the first base station.

With reference to the first aspect, in a fourth possible implementation manner, the apparatus further includes:

a fault detection unit, configured to perform heartbeat detection on links from networks of the operators within coverage of the first base station to the core network, to learn whether there is an operator whose network is faulty.

According to a second aspect, an apparatus for processing a fault in a multi-operator core network is provided, applied to a second base station, where the apparatus includes:

a faulty-operator identifier receiving unit, configured to receive information that carries an identifier of a faulty operator served by a first base station, where the first base station is an adjacent base station of the second base station, and the faulty operator is an operator whose network is faulty within coverage of the first base station; and a UE handover stopping unit, configured to forbid, according to the identifier of the faulty operator, UE served by the second base station to be handed over to the network of the faulty operator within coverage of the first base station.

According to a third aspect, an apparatus for processing a fault in a multi-operator core network is provided, applied to UE served by a first base station, where multiple operators share a network within coverage of the first base station, and the apparatus includes:

a message receiving unit, configured to receive a specified message of the first base station, where the specified message includes an identifier of a faulty operator, and the faulty operator is an operator whose network is faulty within coverage of the first base station; and an access stopping unit, configured to stop, according to the identifier of the faulty operator, sending a request for accessing the network of the faulty operator within coverage of the first base station.

According to a fourth aspect, a method for processing a fault in a multi-operator core network is provided, applied to a first base station, where multiple operators share a network within coverage of the first base station, and the method includes:

acquiring an identifier of a faulty operator, where the faulty operator is an operator whose network is faulty within coverage of the first base station; and notifying UE served by the first base station of the identifier of the faulty operator by using a specified message, so that the UE served by the first base station no longer accesses the network of the faulty operator within coverage of the first base station, where the specified message includes the identifier of the faulty operator.

With reference to the fourth aspect, in a first possible implementation manner, the specified message is a system information block SIB message, a cell barred cellBarred field of the SIB message includes a faulty-operator list, and the faulty-operator list includes the identifier of the faulty operator.

With reference to the fourth aspect, in a second possible implementation manner, the method further includes:

after the acquiring an identifier of a faulty operator, notifying a second base station adjacent to the first base station of the identifier of the faulty operator, so that the second base station forbids UE served by the second base station to be handed over to the network of the faulty operator within coverage of the first base station.

With reference to the second possible implementation manner of the fourth aspect, in a third possible implementation manner, the notifying a second base station adjacent to the first base station of the identifier of the faulty operator includes:

notifying the second base station of the identifier of the faulty operator by sending an X2 configuration update message to the second base station, where the X2 configuration update message carries the identifier of the faulty operator.

With reference to the second possible implementation manner of the fourth aspect, in a fourth possible implementation manner, the notifying a second base station adjacent to the first base station of the identifier of the faulty operator includes:

sending an alarm to an operation support system OSS, so that the OSS notifies the second base station that the network of the faulty operator is faulty within coverage of the first base station.

With reference to the fourth aspect, in a fifth possible implementation manner, the method further includes:

after the acquiring an identifier of a faulty operator, when receiving a UE handover request sent by a second base station adjacent to the first base station, rejecting the UE handover request, where the UE handover request is a request, of UE served by the second base station, of being handed over to the network of the faulty operator within coverage of the first base station.

With reference to the fourth aspect, in a sixth possible implementation manner, the method further includes:

before the acquiring an identifier of a faulty operator, performing heartbeat detection on links from networks of the operators within coverage of the first base station to the core network, to learn whether there is an operator whose network is faulty.

According to a fifth aspect, a method for processing a fault in a multi-operator core network is provided, applied to a second base station, where the method includes:

acquiring an identifier of a faulty operator served by a first base station, where the first base station is an adjacent base station of the second base station, and the faulty operator is an operator whose network is faulty within coverage of the first base station; and forbidding, according to the identifier of the faulty operator, UE served by the second base station to be handed over to the network of the faulty operator within coverage of the first base station.

With reference to the fifth aspect, in a first possible implementation manner, the acquiring an identifier of a faulty operator served by a first base station includes:

acquiring, by receiving an X2 configuration update message sent by the first base station, the identifier of the faulty operator served by the first base station, where the X2 configuration update message carries the identifier of the faulty operator.

With reference to the fifth aspect, in a second possible implementation manner, the acquiring an identifier of a faulty operator served by a first base station includes:

acquiring, by receiving an OSS notification, the identifier of the faulty operator served by the first base station.

According to a sixth aspect, a method for processing a fault in a multi-operator core network is provided, applied to UE served by a first base station, where multiple operators share a network within coverage of the first base station, and the method includes:

receiving a specified message of the first base station, where the specified message includes an identifier of a faulty operator, and the faulty operator is an operator whose network is faulty within coverage of the first base station; and stopping, according to the identifier of the faulty operator, sending a request for accessing the network of the faulty operator within coverage of the first base station.

Some beneficial effects of the present invention may include:

In a scenario in which multiple operators share a network within coverage of a base station, when a network of one operator is faulty or networks of some operators are faulty (for example, an S1 link is faulty), in the embodiments of the present invention, UE served by the base station may be notified of an identifier of the faulty operator by using a specified message (such as a SIB message), so that the UE can correctly determine which operators have a network fault, thereby avoiding an abnormal phenomenon such as a phenomenon that the UE still attempts to access the network of the faulty operator.

It should be understood that the foregoing general description and the following detailed description are merely exemplary, and do not constitute limitations on the present disclosure.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

The foregoing accompanying drawings show specific embodiments of the present invention, and more detailed descriptions are provided in the following. The accompanying drawings and text descriptions are not intended to limit the scope of the idea of the present invention in any manner, but are intended to describe the concept of the present invention to a person skilled in the art with reference to specific embodiments.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Numerous specific details are mentioned in the following detailed descriptions to provide a thorough understanding of the present invention. However, a person skilled in the art should understand that the present invention may be implemented without these specific details. In other embodiments, a structure, a process, a component, and a circuit that are publicly known are not described in detail so as not to unnecessarily obscure the embodiments.

In the prior art, a base station usually notifies, by broadcasting a SIB (System Information Block) message, UE of an operator network that exists in a cell of the second base station. However, during implementation of the present invention, it is found that in a case in which multiple operators share a network within coverage of a base station, when an S1 link of a network of an operator is faulty, UE can be notified, at best, that there is an operator fault, but cannot be further notified of specific operator or operators that are faulty in the prior art. Therefore, the UE cannot identify the faulty operator. When the UE intends to perform selection or reselection, if a target operator happens to be the faulty operator, an abnormal phenomenon in which the UE repeatedly initiates a connection but the connection is repeatedly released occurs.

Embodiment 1

Figure 2:
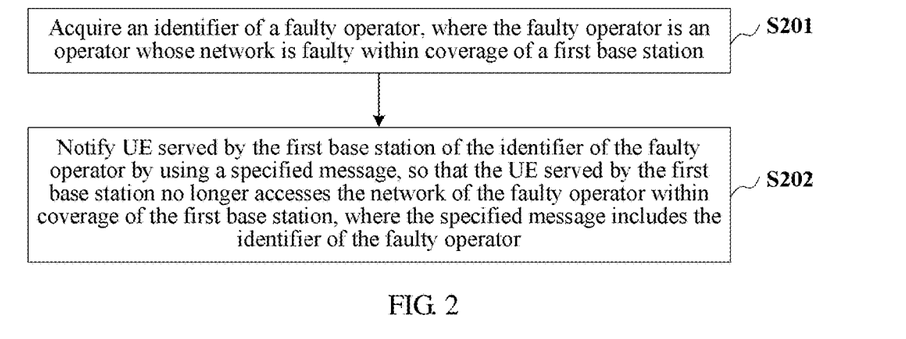
FIG. 2 is an exemplary flowchart of a method according to Embodiment 1 of the present invention.

FIG. 2 is an exemplary flowchart of a method according to Embodiment 1 of the present invention. To resolve the foregoing problem, this embodiment provides a method for processing a fault in a multi-operator core network, applied to a first base station, where multiple operators share a network within coverage of the first base station, and the method includes:

S201: Acquire an identifier of a faulty operator, where the faulty operator is an operator whose network is faulty within coverage of the first base station.

S202: Notify UE served by the first base station of the identifier of the faulty operator by using a specified message, so that the UE served by the first base station no longer accesses the network of the faulty operator within coverage of the first base station, where the specified message includes the identifier of the faulty operator.

In this embodiment, preferably, the specified message may be a SIB message, a cell barred cellBarred field of the SIB message includes a faulty-operator list, and the faulty-operator list includes the identifier of the faulty operator.

The foregoing manner is equivalent to extending the cellBarred field of the SIB message. In some other embodiments of the present invention, another system message, for example, systeminfomodification in a paging message, may be used to carry the identifier of the faulty operator. In addition, a special message may be constructed and a new message format may be defined to carry the identifier of the faulty operator. A specific form of the specified message is not limited in the present invention. None of the messages that may be used herein departs from the spirit and the protection scope of the present invention.

The foregoing description is given from the perspective of a first base station. Correspondingly, from the perspective of UE, the method may include:

receiving a specified message of the first base station, where the specified message includes an identifier of a faulty operator, and the faulty operator is an operator whose network is faulty within coverage of the first base station; and stopping, according to the identifier of the faulty operator, sending a request for accessing the network of the faulty operator within coverage of the first base station.

In addition, in this embodiment or some other embodiments of the present invention, for the first base station, the method may further include:

before the acquiring an identifier of a faulty operator, that is, before step S201, performing heartbeat (heat beat) detection on links from networks of the operators within coverage of the first base station to the core network, to learn whether there is an operator whose network is faulty. During the heartbeat detection, one side of two interconnected sides sends a very small data packet (that is, a heartbeat signal) to the other side at fixed time intervals, and the other side determines, according to needs, whether to reply after receiving the data packet. A function of the heartbeat detection is to confirm one fact: whether the two interconnected sides are both online in a case in which the two interconnected sides do not communicate with each other, or whether a communications link between the two sides is broken.

In a scenario in which multiple operators share a network within coverage of a base station, when a network of one operator is faulty or networks of some operators are faulty (for example, an S1 link is faulty), in this embodiment, UE served by the base station may be notified of an identifier of the faulty operator by using a specified message (such as a SIB message), so that the UE can correctly determine which operators have a network fault, thereby avoiding an abnormal phenomenon such as a phenomenon that the UE still attempts to access the network of the faulty operator.

Embodiment 2

Figure 3:
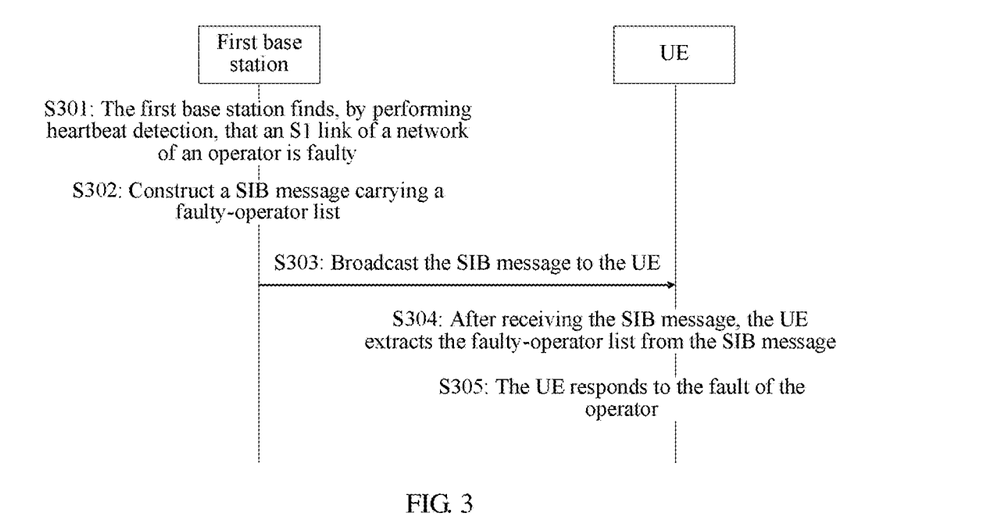
FIG. 3 is a schematic signaling diagram of a method according to Embodiment 2 of the present invention.

FIG. 3 is a schematic signaling diagram of a method according to Embodiment 2 of the present invention. This embodiment is based on Embodiment 1, and provides further details about Embodiment 1.

In the prior art, for some fields of a SIB message broadcast by a base station, refer to the following Table 1, where a cellBarred (cell barred) field is used to indicate whether access to a current cell is forbidden. If an operator of a cell is faulty, UE may not perform access according to the cellBarred field.

TABLE 1

SystemInformationBlock field descriptions cellBarred
barred means the cell is barred, as defined in TS 36.304 [4].
cellReservedForOperatorUse
As defined in TS 36.304 [4].
csg-Identity
Identity of the Closed Subscriber Group the cell belongs to.
csg-Indication
If set to TRUE the UE is only allowed to access the cell if it is a CSG member cell or if selected during manual CSG selection, see TS 36.304 [4].
freqBandIndicator
Defined in TS 36.101 [42, table 5.5-1].
ims-EmergencySupport
Indicates whether the cell supports IMS emergency bearer services for UEs in limited service mode. If absent, IMS emergency call is not supported by the network in the cell for UEs in limited service mode.
intraFreqReselection
Used to control cell reselection to intra-frequency cells when the highest ranked cell is barred, or treated as barred by the UE, as specified in TS 36.304 [4].
plmn-IdentityList
List of PLMN identities. The first listed PLMN-Identity is the primary PLMN.

However, during implementation of the present invention, it is found that the foregoing manner is applicable to a case in which there is only one operator served by a first base station, because in this case, when the operator is faulty, it can be deduced that the cell cannot be accessed. However, when there are multiple operators served by the first base station, this manner has a limitation, because in this case, when one operator is faulty, it does not mean that another operator is also faulty. Therefore, in this case, an indication of the cellBarred field is fuzzy, and therefore, the UE cannot identify the faulty operator among the operators, and further cannot take right measures.

In view of this, the cellBarred field in the SIB message is extended in this embodiment, and a faulty-operator list (that is, CellBarredPlmnList in Table 2) is added. The faulty-operator list may be used to provide a list of identifiers of faulty operators, that is, indicate which specific operator or operators are faulty. That is, in this embodiment, universal cellBarred for all operator networks (PLMN) is changed into cellBarred for each individual PLMN. After learning CellBarredPlmnList, the UE may choose not to access the operators served by the first base station that are in the list, but choose to access another operator served by the first base station, or choose to access another base station, and so on.

TABLE 2

SystemInformationBlock field descriptions cellBarred
barred means the cell is barred, as defined in TS 36.304 [4].
CellBarredPlmnList
List of PLMN identities with cell barred.
cellReservedForOperatorUse
As defined in TS 36.304 [4].
csg-Identity
Identity of the Closed Subscriber Group the cell belongs to.
csg-Indication
If set to TRUE the UE is only allowed to access the cell if it is a CSG member cell or if selected during manual CSG selection, see TS 36.304 [4].
freqBandIndicator
Defined in TS 36.101 [42, table 5.5-1].
ims-EmergencySupport
Indicates whether the cell supports IMS emergency bearer services for UEs in limited service mode. If absent, IMS emergency call is not supported by the network in the cell for UEs in limited service mode.
intraFreqReselection
Used to control cell reselection to intra-frequency cells when the highest ranked cell is barred, or treated as barred by the UE, as specified in TS 36.304 [4].
plmn-IdentityList
List of PLMN identities. The first listed PLMN-Identity is the primary PLMN.

Specifically, this embodiment may include the following steps:

From the perspective of the first base station:

S301: A first base station finds, by performing heartbeat detection, that an S1 link of a network of an operator is faulty.

S302: Construct a SIB message carrying a faulty-operator list.

S303: Broadcast the SIB message to UE.

From the perspective of the UE:

S304: After receiving the SIB message, the UE extracts the faulty-operator list from the SIB message.

S305: The UE responds to the fault of the operator, for example, stops accessing the operator that is served by the first base station and that is in the list, or chooses to access another operator that is served by the first base station and that is not in the list, or chooses to access another base station, and so on.

Certainly, the foregoing is merely an example. In some other embodiments of the present invention, the SIB message may also be extended in another manner, or another system message is extended, or a new massage is defined, to carry an identifier of a faulty operator, which is not limited in this embodiment of the present invention, and none of the manners that may be used herein departs from the spirit and the protection scope of the present invention.

In a scenario in which multiple operators share a network within coverage of a base station, when a network of one operator is faulty or networks of some operators are faulty (for example, an S1 link is faulty), in this embodiment, UE served by the base station may be notified of an identifier of the faulty operator by using a specified message (such as a SIB message), so that the UE can correctly determine which operators have a network fault, thereby avoiding an abnormal phenomenon such as a phenomenon that the UE still attempts to access the network of the faulty operator.

Embodiment 3

This embodiment is based on the foregoing embodiment, and is a further extension and improvement of the foregoing embodiment. In the foregoing embodiment, the first base station may notify, by extending the SIB message, a UE in a cell of the first base station of operators that have a link fault, thereby avoiding an access error of the UE and resolving a basic problem that arises when a fault occurs in a multi-operator core network. In this embodiment, the faulty base station (that is, the first base station) may further notify an adjacent base station (that is, a second base station) of fault information of the operator, so that the adjacent base station performs a corresponding reaction, thereby further improving a fault processing mechanism.

Specifically, in this embodiment, for the first base station, the method may further include:

after acquiring an identifier of a faulty operator, notifying a second base station adjacent to the first base station of the identifier of the faulty operator, so that the second base station forbids UE served by the second base station to be handed over to the network of the faulty operator within coverage of the first base station.

The foregoing description is given from the perspective of the first base station. From the perspective of the second base station, the method may include:

acquiring an identifier of a faulty operator served by a first base station, where the first base station is an adjacent base station of the second base station, and the faulty operator is an operator whose network is faulty within coverage of the first base station; and forbidding, according to the identifier of the faulty operator, UE served by the second base station to be handed over to the network of the faulty operator within coverage of the first base station.

During specific implementation, the first base station may notify the second base station of the identifier of the faulty operator in multiple manners. Some examples are given below:

(1) In a first implementation manner, the notifying a second base station adjacent to the first base station of the identifier of the faulty operator may specifically include:

notifying the second base station of the identifier of the faulty operator by sending an X2 configuration update message to the second base station, where the X2 configuration update message carries the identifier of the faulty operator.

The foregoing description is given from the perspective of the first base station. From the perspective of the second base station, the acquiring an identifier of a faulty operator served by a first base station includes:

acquiring, by receiving an X2 configuration update message sent by the first base station, the identifier of the faulty operator served by the first base station, where the X2 configuration update message carries the identifier of the faulty operator.

Figure 4:
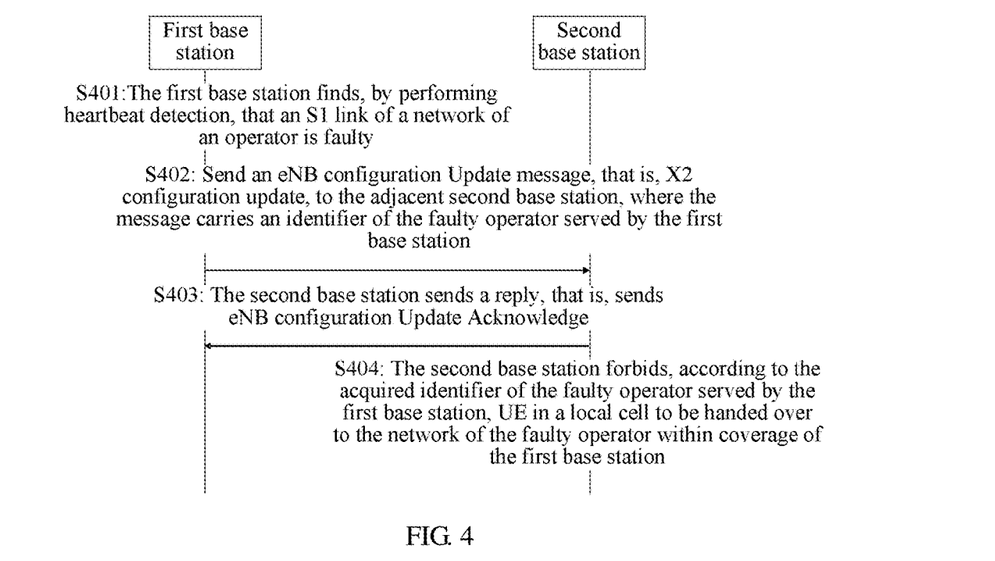
FIG. 4 is a schematic signaling diagram of a first implementation manner according to Embodiment 3 of the present invention.

FIG. 4 is a schematic signaling diagram of the first implementation manner according to Embodiment 3 of the present invention, which may include the following steps:

From the perspective of a first base station:

S401: The first base station finds, by performing heartbeat detection, that an S1 link of a network of an operator is broken.

S402: Send an eNB configuration Update message, that is, X2 configuration update, to an adjacent second base station, where the message carries an identifier of the faulty operator served by the first base station.

From the perspective of the second base station:

S403: The second base station sends a acknowledgement, that is, sends eNB configuration Update Acknowledge.

S404: The second base station forbids, according to the acquired identifier of the faulty operator served by the first base station, a UE in a cell of the second base station to be handed over to the network of the faulty operator within coverage of the first base station. Specifically, a Barred PLMN field may be added to a neighbor cell list (NCL, Neighbour Cell List) of the second base station, to indicate which operators in each neighbor cell of the second base station have a network fault.

It is easy to understand that a sequence of the two foregoing steps S403 and S404 may not be fixed.

(2) In a second implementation manner, the notifying a second base station adjacent to the first base station of the identifier of the faulty operator includes:

sending an alarm to an OSS, so that the OSS notifies the second base station that the network of the faulty operator is faulty within coverage of the first base station.

The foregoing description is given from the perspective of the first base station. From the perspective of the second base station, the acquiring an identifier of a faulty operator served by a first base station includes:

acquiring, by receiving an OSS notification, the identifier of the faulty operator served by the first base station.

Figure 5:
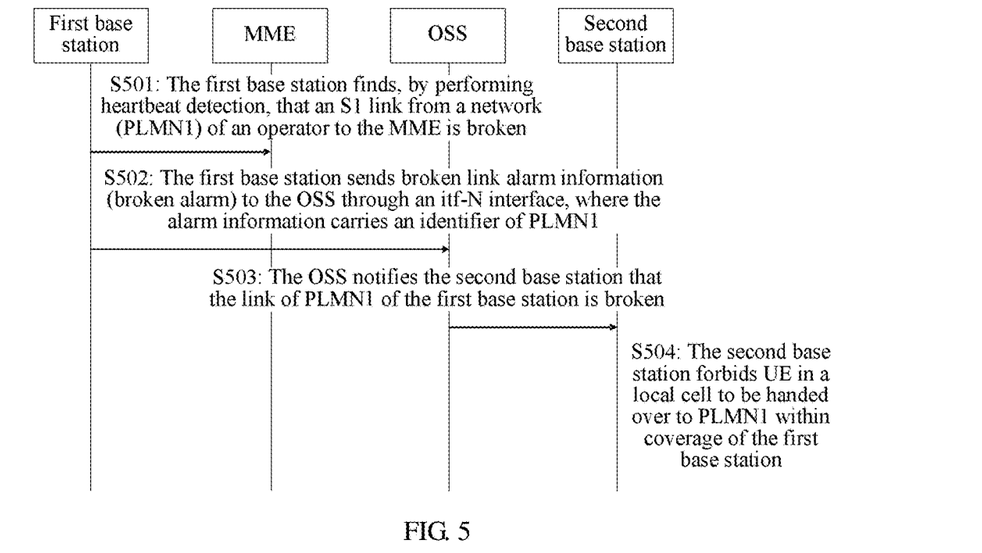
FIG. 5 is a schematic signaling diagram of a second implementation manner according to Embodiment 3 of the present invention.

FIG. 5 is a schematic signaling diagram of a second implementation manner according to Embodiment 3 of the present invention, which may include the following steps:

S501: A first base station finds, by performing heartbeat detection, that an S1 link from a network (PLMN1) of an operator to an MME is broken.

S502: The first base station sends broken link alarm information (broken alarm) to an OSS through itf-N (interface Northbound, interface northbound), where the alarm information carries an identifier of PLMN1.

S503: The OSS notifies the second base station that the link of PLMN1 within coverage of the first base station is broken.

S504: The second base station forbids UE in a cell of the second base station to be handed over to PLMN1 within coverage of the first base station.

In this embodiment, a faulty base station (that is, the first base station) further notifies an adjacent base station (that is, the second base station) of fault information of an operator, so that the adjacent base station learns which PLMNs within coverage of the faulty base station are faulty, so as to perform a corresponding reaction, thereby further improving a fault processing mechanism.

Embodiment 4

This embodiment is based on the foregoing embodiment, and is a further extension and improvement on the foregoing embodiment. After a link of an operator served by a first base station is faulty, if an adjacent base station is notified in time, the adjacent base station can actively prevent UE served by the adjacent base station from being handed over to the faulty operator served by the first base station (refer to Embodiment 3). But if the adjacent base station is not notified in time, there may still be UE that intends to be handed over from the adjacent base station to the faulty operator served by the first base station. In view of this, in this embodiment, the first base station may actively reject the handover requested by the UE served by the adjacent base station. That is, in this embodiment, for the first base station, the method may further include:

after the acquiring an identifier of a faulty operator, when receiving a UE handover request sent by a second base station adjacent to the first base station, rejecting the UE handover request, where the UE handover request is a request, of UE served by the second base station, for being handed over to the network of the faulty operator within coverage of the first base station.

Figure 6:
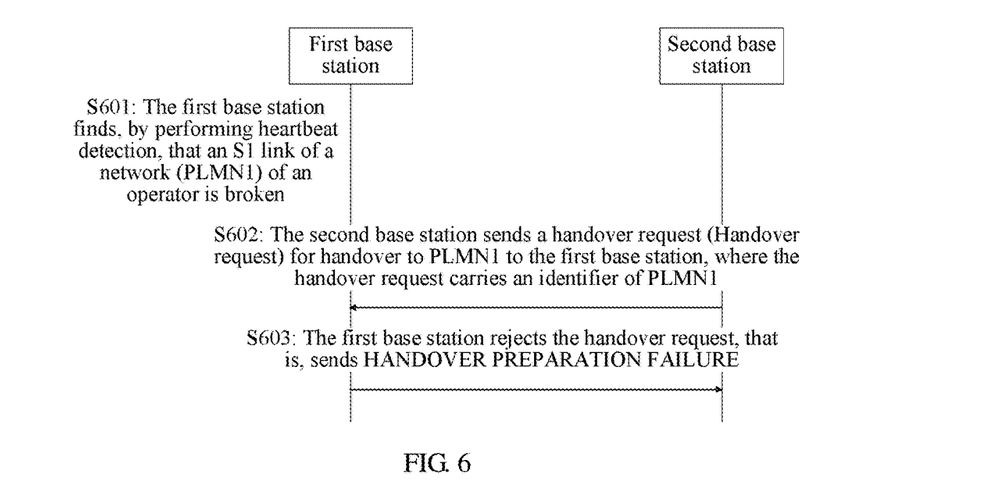
FIG. 6 is a schematic signaling diagram of a method according to Embodiment 4 of the present invention.

FIG. 6 is a schematic signaling diagram of a method according to Embodiment 4 of the present invention, which may include the following steps:

S601: A first base station finds, by performing heartbeat detection, that an S1 link of a network (PLMN1) of an operator is faulty.

S602: A second base station sends a handover request (Handover request) for handover to PLMN1 to the first base station, where the handover request carries an identifier of PLMN1.

S603: The first base station rejects the handover request, that is, sends HANDOVER PREPARATION FAILURE. Further, a cause value (Cause Value) may be extended in HANDOVER PREPARATION FAILURE, to indicate which operators served by the first base station have a broken link.

In this embodiment, after a network of an operator becomes faulty within coverage of a first base station, if there still is UE that intends to be handed over from an adjacent base station to the faulty operator served by the first base station, the first base station actively rejects the handover requested by the UE served by the adjacent base station, thereby avoiding a negative effect such as a phenomenon that the UE repeatedly initiates a connection but the connection is repeatedly released.

Embodiment 5

Corresponding to the foregoing embodiments of the method for processing a fault in a multi-operator core network of the present invention, this embodiment of the present invention further provides an apparatus for processing a fault in a multi-operator core network.

Figure 7:
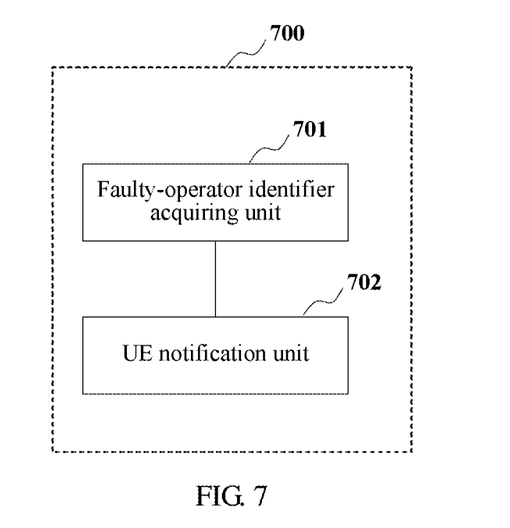
FIG. 7 is a schematic diagram of an apparatus applied to a first base station according to Embodiment 5 of the present invention.

This embodiment provides an apparatus 700 for processing a fault in a multi-operator core network, as shown in FIG. 7. The apparatus 700 is applied to a first base station, multiple operators share a network within coverage of the first base station, and the apparatus 700 may include:

a faulty-operator identifier acquiring unit 701, configured to acquire an identifier of a faulty operator, where the faulty operator is an operator whose network is faulty within coverage of the first base station; and a UE notification unit 702, configured to notify UE served by the first base station of the identifier of the faulty operator by sending a specified message, so that the UE served by the first base station no longer accesses the network of the faulty operator within coverage of the first base station, where the specified message includes the identifier of the faulty operator.

Preferably, the specified message is a system information block SIB message, a cell barred cellBarred field of the SIB message includes a faulty-operator list, and the faulty-operator list includes the identifier of the faulty operator.

In this embodiment or some other embodiments of the present invention, the apparatus 700 may further include:

an adjacent-base station notification unit, configured to notify a second base station adjacent to the first base station of the identifier of the faulty operator, so that the second base station forbids UE served by the second base station to be handed over to the network of the faulty operator within coverage of the first base station.

In this embodiment or some other embodiments of the present invention, the apparatus 700 may further include:

a UE access stopping unit, configured to: when receiving a UE handover request sent by a second base station adjacent to the first base station, reject the UE handover request, where the UE handover request is a request, of UE served by the second base station, for being handed over to the network of the faulty operator within coverage of the first base station.

In addition, in this embodiment or some other embodiments of the present invention, the apparatus 700 may further include:

a fault detection unit, configured to perform heartbeat detection on links from networks of the operators within coverage of the first base station to the core network, to learn whether there is an operator whose network is faulty.

In a scenario in which multiple operators share a network within coverage of a base station, when a network of one operator is faulty or networks of some operators are faulty (for example, an S1 link is faulty), in this embodiment, UE served by the base station may be notified of an identifier of the faulty operator by using a specified message (such as a SIB message), so that the UE can correctly determine which operators have a network fault, thereby avoiding an abnormal phenomenon such as a phenomenon that the UE still attempts to access the network of the faulty operator.

Figure 8:
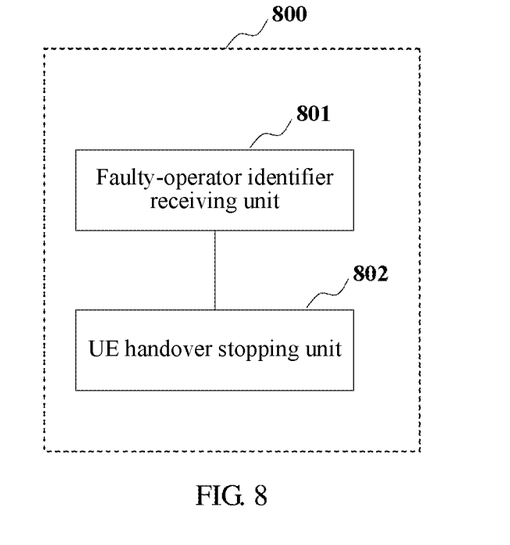
FIG. 8 is a schematic diagram of an apparatus applied to a second base station according to Embodiment 5 of the present invention.

In this embodiment, for the second base station, an apparatus 800 for processing a fault in a multi-operator core network may be further correspondingly provided, as shown in FIG. 8. The apparatus 800 is applied to the second base station, and may include:

a faulty-operator identifier receiving unit 801, configured to receive information that carries an identifier of a faulty operator served by a first base station, where the first base station is an adjacent base station of the second base station, and the faulty operator is an operator whose network is faulty within coverage of the first base station; and a UE handover stopping unit 802, configured to forbid, according to the identifier of the faulty operator, UE served by the second base station to be handed over to the network of the faulty operator within coverage of the first base station.

According to the foregoing apparatus 800, a faulty base station (that is, the first base station) further notifies an adjacent base station (that is, the second base station) of fault information of an operator, so that the adjacent base station learns which PLMNs within coverage of the faulty base station are faulty, so as to perform a corresponding reaction, thereby further improving a fault processing mechanism.

Figure 9:
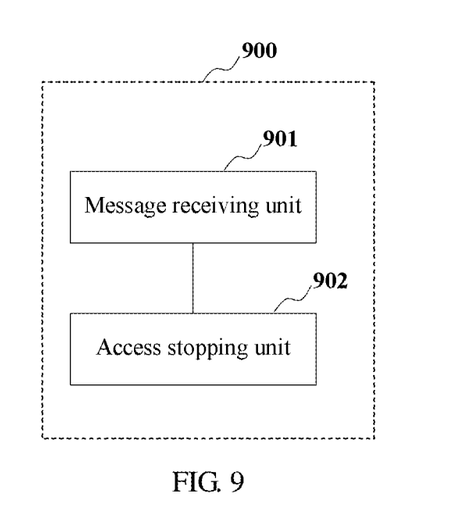
FIG. 9 is a schematic diagram of an apparatus applied to UE according to Embodiment 5 of the present invention.

In this embodiment, for the UE served by the first base station, an apparatus 900 for processing a fault in a multi-operator core network may be further correspondingly provided, as shown in FIG. 9. The apparatus 900 is applied to the UE served by the first base station, multiple operators share a network within coverage of the first base station, and the apparatus 900 may include:

a message receiving unit 901, configured to receive a specified message of the first base station, where the specified message includes an identifier of a faulty operator, and the faulty operator is an operator whose network is faulty within coverage of the first base station; and an access stopping unit 902, configured to stop, according to the identifier of the faulty operator, sending a request for accessing the network of the faulty operator within coverage of the first base station.

According to the foregoing apparatus 900, after a network of an operator becomes faulty within coverage of a first base station, if there still is UE that intends to be handed over from an adjacent base station to the faulty operator served by the first base station, the first base station actively rejects the handover requested by the UE served by the adjacent base station, thereby avoiding a negative effect such as a phenomenon that the UE repeatedly initiates a connection but the connection is repeatedly released.

An apparatus embodiment basically corresponds to a method embodiment, and therefore for related parts, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

Embodiment 6

Figure 10:
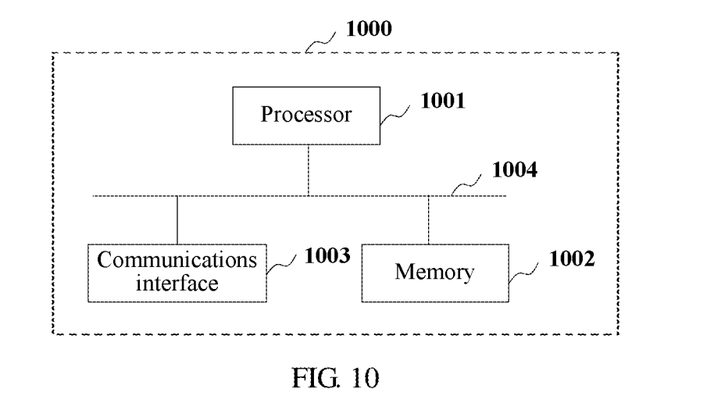
FIG. 10 is a schematic diagram of a device applied to a first base station according to Embodiment 6 of the present invention.

An apparatus for processing a fault in a multi-operator core network provided in this embodiment of the present invention may be implemented based on a computer system. The foregoing fault processing method may be implemented on the fault processing apparatus based on the computer system, that is, a fault processing device. Therefore, this embodiment provides a device 1000 for processing a fault in a multi-operator core network, as shown in FIG. 10. The device 1000 is applied to a first base station, multiple operators share a network within coverage of the first base station, and the device 1000 may include a processor 1001, a memory 1002, a communications interface 1003, and a bus 1004.

The processor 1001, the memory 1002, and the communications interface 1003 are connected to and communicate with each other by using the bus 1004.

The memory 1002 is configured to store a program instruction.

The processor 1001 is configured to invoke the program instruction stored in the memory 1002, to execute the following operations: acquiring an identifier of a faulty operator, where the faulty operator is an operator whose network is faulty within coverage of the first base station; sending a specified message by using the communications interface 1003; and notifying UE served by the first base station of the identifier of the faulty operator, so that the UE served by the first base station no longer accesses the network of the faulty operator within coverage of the first base station, where the specified message includes the identifier of the faulty operator.

Figure 11:
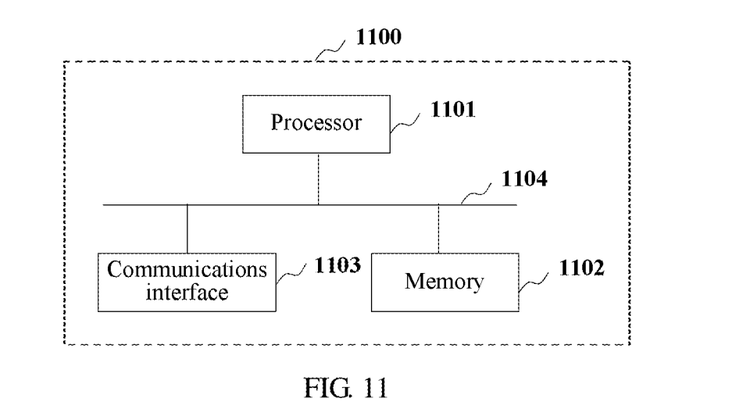
FIG. 11 is a schematic diagram of a device applied to a second base station according to Embodiment 6 of the present invention.

In this embodiment, for the second base station, a device 1100 for processing a fault in a multi-operator core network is further correspondingly provided, as shown in FIG. 11. The device 1100 is applied to the second base station and may include a processor 1101, a memory 1102, a communications interface 1103, and a bus 1104.

The processor 1101, the memory 1102, and the communications interface 1103 are connected to and communicate with each other by using the bus 1104.

The memory 1102 is configured to store a program instruction.

The processor 1101 is configured to invoke the program instruction stored in the memory 1102, to execute the following operations: receiving, by using the communications interface 1103, information carrying an identifier of a faulty operator served by a first base station, where the first base station is an adjacent base station of the second base station, and the faulty operator is an operator whose network is faulty within coverage of the first base station; and forbidding, according to the identifier of the faulty operator, UE served by the second base station to be handed over to the network of the faulty operator within coverage of the first base station.

In a scenario in which multiple operators share a network within coverage of a base station, when a network of one operator is faulty or networks of some operators are faulty (for example, an S1 link is faulty), in this embodiment, UE served by the base station may be notified of an identifier of the faulty operator by using a specified message (such as a SIB message), so that the UE can correctly determine which operators have a network fault, thereby avoiding an abnormal phenomenon such as a phenomenon that the UE still attempts to access the network of the faulty operator.

In this embodiment, a faulty base station (that is, the first base station) further notifies an adjacent base station (that is, the second base station) of fault information of an operator, so that the adjacent base station learns which PLMNs within coverage of the faulty base station are faulty, so as to perform a corresponding reaction, thereby further improving a fault processing mechanism.

Figure 12:
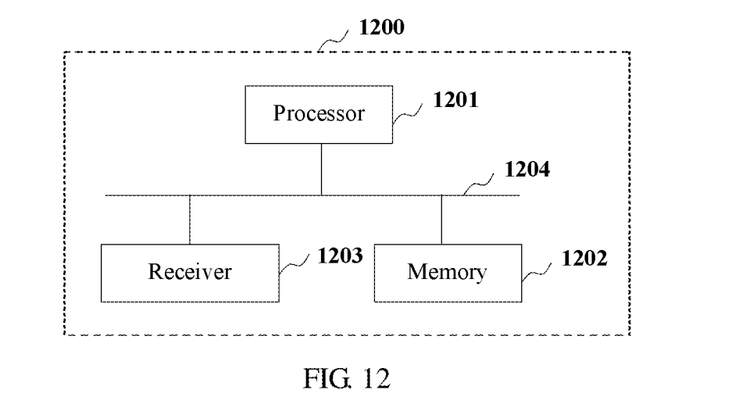
FIG. 12 is a schematic diagram of a device applied to UE according to Embodiment 6 of the present invention.

In this embodiment, for the UE served by the first base station, a device 1200 for processing a fault in a multi-operator core network may be further correspondingly provided, as shown in FIG. 12. Multiple operators share a network within coverage of the first base station, and the device 1200 may include a processor 1201, a memory 1202, a receiver 1203, and a bus 1204.

The processor 1201, the memory 1202, and the receiver 1203 are connected to and communicate with each other by using the bus 1204.

The memory 1202 is configured to store a program instruction.

The processor 1201 is configured to invoke the program instruction stored in the memory 1202, to execute the following operations: receiving a specified message of the first base station by using the receiver 1203, where the specified message includes an identifier of a faulty operator, and the faulty operator is an operator whose network is faulty within coverage of the first base station; and stopping, according to the identifier of the faulty operator, sending a request for accessing the network of the faulty operator within coverage of the first base station.

In this embodiment, after a network of an operator becomes faulty within coverage of a first base station, if there still is UE that intends to be handed over from an adjacent base station to the faulty operator served by the first base station, the first base station actively rejects the handover requested by the UE served by the adjacent base station, thereby avoiding a negative impact such as a phenomenon that the UE repeatedly initiates a connection but the connection is repeatedly released.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for processing a network fault in a multi-operator core network, applied to a first base station, wherein a plurality of network operators shares the core network within coverage of the first base station, and the apparatus comprises:
   a memory; and
   a processor coupled to the memory and configured to:
   perform heartbeat detection on a link from each of the plurality of operators of the shared core network within coverage of the first base station to the core network by sending a very small packet at a fixed time interval on the link, to learn whether the link is broken, indicating the operator of the link has a network fault;
   acquire an identifier of the operator having the network fault, wherein the operator is an operator whose network is faulty within coverage of the first base station;
   notify a second base station adjacent to the first base station of the identifier of the operator having the network fault by sending an X2 configuration update message to the second base station, wherein the X2 configuration update message comprises the identifier of the operator having the network fault, so that the second base station forbids UE served by the second base station to be handed over to the network operated by the operator having the network fault within coverage of the first base station; and
   notify a UE served by the first base station of the identifier of the operator having the network fault by sending a specified message, so that the UE served by the first base station no longer accesses the network operated by the operator having the network fault within coverage of the first base station, wherein
   the specified message comprises the identifier of the operator having the network fault,
   the specified message is a system information block (SIB) message, a cell barred cellBarred field of the SIB message comprises a faulty-operator list, and the faulty-operator list comprises the identifier of the operator having the network fault.

2. The apparatus according to claim 1, wherein the processor is further configured to:
   when receiving a UE handover request sent by a second base station adjacent to the first base station, reject the UE handover request, wherein the UE handover request is a request, of a UE served by the second base station, for being handed over to the network operated by the operator having the network fault within coverage of the first base station.

3. The apparatus according to claim 1, wherein the operator having the network fault is one of the multiple operators that share the shared network.

4. The apparatus according to claim 1, wherein the network fault of the operator having the network fault is a broken S1 link.

5. An apparatus for processing a network fault in a multi-operator core network, applied to user equipment (UE) served by a first base station, wherein a plurality of network operators shares the core network within coverage of the first base station, and the apparatus comprises:
   a memory; and
   a processor coupled to the memory and configured to:
   perform heartbeat detection on a link from each of the plurality of operators of the shared network within coverage of the first base station to the core network by sending a very small packet at a fixed time interval on the link, to learn whether the link is broken, indicating the operator of the link has a network fault;

receive a specified message of the first base station, wherein the specified message comprises an identifier of an operator of the network operated by the operator having the network fault, and the operator having the network fault is an operator whose network is faulty within coverage of the first base station;

notify a second base station adjacent to the first base station of the identifier of the operator having the network fault by sending an X2 configuration update message to the second base station, wherein the X2 configuration update message comprises the identifier of the operator having the network fault, so that the second base station forbids UE served by the second base station to be handed over to the network operated by the operator having the network fault within coverage of the first base station; and stop, according to the identifier of the operator having the network fault, sending a request for accessing the network operated by the operator having the network fault within coverage of the first base station, wherein the specified message is a system information block (SIB) message, a cell barred cellBarred field of the SIB message comprises a faulty-operator list, and the faulty-operator list comprises the identifier of the operator having the network fault.

6. A method for processing a fault in a multi-operator core network, applied to a first base station, wherein a plurality of network operators shares the core network within coverage of the first base station, and the method comprises:

performing heartbeat detection on a link from each of the plurality of operators of the shared network within coverage of the first base station to the core network by sending a very small packet at a fixed time interval on the link, to learn whether the link is broken, indicating the operator of the link has a network fault;

acquiring an identifier of the operator having the network fault, wherein the operator is an operator whose network is faulty within coverage of the first base station;

notifying a second base station adjacent to the first base station of the identifier of the operator having the network fault by sending an X2 configuration update message to the second base station, wherein the X2 configuration update message comprises the identifier of the operator having the network fault, so that the second base station forbids UE served by the second base station to be handed over to the network operated by the operator having the network fault within coverage of the first base station;

notifying a UE served by the first base station of the identifier of the operator having the network fault by sending a specified message, so that the UE served by the first base station no longer accesses the network operated by the operator having the network fault within coverage of the first base station, wherein the specified message comprises the identifier of the operator having the network fault, the specified message is a system information block (SIB) message, a cell barred cellBarred field of the SIB message comprises a faulty-operator list, and the faulty-operator list comprises the identifier of the operator having the network fault.

7. The method according to claim 6, wherein the notifying a second base station adjacent to the first base station of the identifier of the operator having the network fault comprises:

sending an alarm to an operations support system OSS, so that the OSS notifies the second base station that the network operated by the operator having the network fault is faulty within coverage of the first base station.

8. The method according to claim 6, wherein the method further comprises:

after acquiring an identifier of an operator of the network operated by the operator having the network fault, when receiving a UE handover request sent by a second base station adjacent to the first base station, rejecting the UE handover request, wherein the UE handover request is a request, of UE served by the second base station, for being handed over to the network operated by the operator having the network fault within coverage of the first base station.

9. The method according to claim 6, wherein the method further comprises:

before acquiring an identifier of an operator of the network operated by the operator having the network fault, performing heartbeat detection on links from networks of the operators within coverage of the first base station to a core network, to learn whether there is an operator whose network is faulty.

* * * * *